3,419,595
FLUOROCARBON FLUOROALKANESULFONATES
Robert L. Hansen, Roseville, Minn., assignor to Minnesota Mining & Manufacturing Company, St. Paul, Minn., a corporation of Delaware
No Drawing. Filed Mar. 5, 1965, Ser. No. 437,573
3 Claims. (Cl. 260—456)

ABSTRACT OF THE DISCLOSURE

Highly fluorinated sulfonate esters of highly fluorinated carbinols are provided which are very useful for substitution of the highly fluorinated carbinol groups on nucleophile. Exemplary of such compounds are 1,1-dihydroperfluoroalkyl perfluoroalkanesulfonates.

---

This invention relates to a new class of useful organic compounds, to processes using the said compounds and to compositions obtained by the processes.

The introduction of 1,1-dihydroperfluoroalkyl groups and the omega-hydro and omega-chloro derivatives thereof into organic structures and indeed even the formation of such simple derivatives as the iodides thereof by nucleophilic displacement has been found to be relatively difficult. In these reactions a compound $R_fCH_2X$, in which X is a group such as chloride, bromide, iodide, or p-toluenesulfonate, sometimes termed a leaving group, reacts with a nucleophilic organic compound, e.g., amine, alcohol, mercaptan, phenol, etc., the residue of which replaces the X group. For example, W. V. Cohen, Journal Organic Chemistry, vol. 26, pages 4021 et seq. (1961), and papers there cited, show that those reactions which have been examined tend to proceed relatively slowly, in poor, or at best, mediocre yields. Inasmuch as highly fluorinated intermediates are relatively expensive as compared to the corresponding nonfluorinated intermediates, the difficulty of these reactions, requiring elevated temperatures and prolonged reactions, has heretofore made many classes of materials susbtantially unavailable.

It is one object of this invention to provide intermediates for the introduction of 1,1-dihydroperfluoroalkyl groups into organic compounds.

It is a further object of this invention to provide 1,1-dihydroperfluoroalkyl ethers of phenols.

It is another object of this invention to provide intermediates for the introduction of 1,1-ω-trihydroperfluoroalkyl groups into organic compounds.

It is yet another object of this invention to provide 1,1-dihydroperfluoroalkane phosphonic acid esters.

Other objects will become evident from the disclosure herein.

In accordance with the above and other objects of the invention it has been found that esters of the structure $$(R_fSO_2OCH_2)_mQ$$

wherein $m$ is an integer from 1 to 2, $R_f$ is hyperfluorinated alkyl of 1 to 8 carbon atoms, Q is an m-valent group free from hydrogen on valence carbon atoms and comprising at least about 40 percent by weight of fluorine and $m$ is an integer from 1 to 2 are stable to simple hydrolysis so that they can be handled without special precautions and are powerful alkylating agents for reaction with nucleophiles of nucleophilic constant greater than 1. In all cases yields as alkylating agents are very good to excellent, often above 90 mole percent.

The concept of a nucleophilic constant $n$ and electrophilic constant $e$ was developed by C. G. Swain and C. B. Scott in the Journal of the American Chemical Society, vol. 75, page 141 et seq. (1953), for a given nucleophilic reaction and standard nucleophilic reaction (e.g., the comparable reaction in which water is the nucleophile having respective reaction rate constants $k$ and $k_0$ and sensitivities of S and S' to the nucleophilicity and electrophilicity of the medium respectively. The relationships are given by: $\log k/k_0 = S_n + S'_e$. Reactions of the sulfonates of the invention are nucleophilic processes.

Suitable nucleophiles having nucleophilic constants above 1 include, for example, (a) Monovalent inorganic anions such as SCN, Cl, Br and I, and the like as well as
(b) Anions of such aliphatic alcohols of 1 to 20 carbon atoms as: methanol, ethanol, decyl alcohol, isobutyl alcohol, dibutyl carbinol, lauryl alcohol, myristyl alcohol, stearyl alcohol, eicosyl alcohol, and the like;
(c) Anions of such aromatic hydroxy compounds of 6 to 20 carbon atoms as: phenol, o-allyl phenol, p-nitrophenol, α-naphthol, 5-decyl-1-naphthol, p-cyclohexylphenol, 4,4'-dihydroxydiphenylsulfone, dehydro-β-naphthol and the like;
(d) Anions of such aliphatic mercaptans of 1 to 20 carbon atoms as: methanethiol, butanethiol, eicosyl mercaptan, decyl mercaptan and the like;
(e) Anions of such aromatic thiols of 6 to 20 carbon atoms as: thiophenol, p-tetradecylthiophenol, p-phenoxythiophenol and the like;
(f) Aliphatic primary, secondary and tertiary amines of 1 to 20 carbon atoms such as: methylamine, allylamine, stearylamine, N-ethylstearylamine, N,N-dimethylstearylamine, tributylamine, dicyclohexylamine, and the like;
(g) Aromatic and mixed aralkyl amines of 6 to 20 carbon atoms, such as: aniline, p-toluidine, 4,4'-diaminodiphenylsulfone, benzylamine, 2-phenylethylamine, diphenylamine, n-decyl-α-naphthylamine and the like;
(h) Heterocyclic amines of 2 to 20 carbon atoms, such as: morpholine, pyridine, ethylenimine, piperazine, pyrrolidine, imidazole, pyrazine, and the like;
(i) Anions of such aliphatic and alicyclic sulfides of 2 to 12 carbon atoms as: dimethylsulfide, diallylsulfide, methyl stearyl sulfide, tetrahydrothiophene and the like;
(j) Thiourea;
(k) Anions of active hydrogen compounds of 2 to 20 carbon atoms, such as: acetylene, cyclohexyl acetylene, phenyl acetylene, octadecyl acetylene, diethyl malonate, diethyl ethylmalonate, 3-methyl acetylacetone, acetoacetic ester, cyclopentadiene, phenyl cyclopentyl sulfone, thiolacetic acid, thiolbenzoic acid and the like;
(l) Anions of orthophosphorous acid bis-esters of alcohols and phenols of 1 to 8 carbon atoms such as: dimethyl phosphite, diethyl phosphite, dibutyl phosphite, dioctyl phosphite, diphenyl phosphite, dicresyl phosphite and the like.

The term hyperfluorinated alkyl is employed to designate acyclic and cyclic alkyl groups containing at least 2 fluorine atoms and not more than 1 hydrogen atom and containing from 1 to 8 carbon atoms. The sulfonyl fluorides and chlorides useful in preparing esters of the invention are thus of the formula $R_fSO_2F$ and $R_fSO_2Cl$, respectively. In particular it is preferred to employ hyperfluorinated alkanesulfonyl fluorides and chlorides of the group in which $R_f$ is a member of the group consisting of perfluoroalkyl of 1 to 8 carbon atoms, perfluorocycloalkyl of 4 to 8 carbon atoms, and 2-hydroperfluoroalkyl of 2 to 7 carbon atoms. The acid fluorides and chlorides of the perfluorinated acids are available as described in U.S. Patent No. 2,732,398 and the chlorides of the 2-hydroperfluorinated acids are described by Coffman and Raasch, Journal of Organic Chemistry, volume 14, page 747 et seq. (1949).

The highly fluorinated alkyl group in which Q comprises at least about 40 percent of fluorine are preferably selected from the group consisting of:

(a) Perfluoroalkyl of 1 to 17 carbon atoms,
(b) Perfluorocycloalkyl of 4 to 11 carbon atoms,
(c) Omega-hydroperfluoroalkyl of an even number of carbon atoms from 2 to 18,
(d) 2-hydroperfluoroalkyl of 3 to 11 carbon atoms,
(e) Chloro-difluoromethyl,
(f) 3-oxa-perfluoroalkyl of 3 to 6 carbon atoms and 1 oxygen atom,
(g) Perfluoro-oxa-cycloalkyl of 4 to 6 carbon atoms,
(h) Perfluoroalkylene of 1 to 10 carbon atoms,
(i) Perfluorocycloalkylene of 6 to 12 carbon atoms.

In general, the 1,1-dihydro highly fluorinated alcohols or carbinols of the formula $Q(CH_2OH)_m$ employed as reactants are obtained by reduction of the carboxylic acid with lithium aluminum hydride or by catalytic hydrogenation over a copper-chromium oxide catalyst as described in U.S. Patent No. 2,666,797. Suitable trihydroperfluoroalkanols are available by the free radical addition of methanol to perfluoroolefins, e.g., $CF_3CF=CF_2$, $C_5F_{11}CF=CF_2$, as described by La Zerte and Koshar in the Journal of the American Chemical Society, volume 77, page 910 et seq. (1955), or by free radical telomerization of tetrafluoroethylene with methanol as described by Joyce in U.S. Patent No. 2,559,628.

The perfluoroalkanesulfonate esters of the invention are prepared from the sulfonyl fluorides or chlorides and carbinol in the presence of an acid acceptor, preferably employing triethylamine or other comparably strong tertiary amine as a base. The use of pyridine tends to lead to extensive quaternization and is generally unsatisfactory. The perfluoroalkane sulfonyl fluorides are readily available by the electrochemical fluorination of the alkanesulfonyl fluorides or chlorides as described in U.S. Patent No. 2,732,398. It is generally preferred to use perfluoromethanesulfonyl fluoride because the stoichiometry is most economical, that is, the cost per mole is lower, but higher sulfonyl fluorides are otherwise equally satisfactory.

The invention is now more fully described by examples showing the best mode presently contemplated of practicing the invention. In these examples, parts are by weight and temperatures are in degrees centigrade unless otherwise indicated.

Example 1

In a tared vessel fitted for mechanical agitation a total of 84.5 parts (0.555 mole) of trifluoromethanesulfonyl fluoride (B.P. −26° C.) is condensed at about −75° C. To the vessel are added 100 parts by volume of methylene chloride and the equipment is then modified by replacing the gas inlet assembly by a dropping funnel. A mixture of 55.5 parts (0.555 mole) of 2,2,2-trifluoroethanol and 56 parts (0.555 mole) of triethylamine is then added gradually over about 20 minutes while maintaining the temperature of the reaction mixture at about −40° to −30° C. The reaction mixture is warmed to 0° and the clear solution is washed successively (in parts by volume) with 100 parts of 5 percent aqueous hydrochloric acid, 100 parts of 5 percent aqueous sodium hydroxide and twice with 50 parts of water. The solution is dried over anhydrous magnesium sulfate, filtered and concentrated and finally fractionally distilled to give 95.5 parts of 2,2,2-trifluoroethyl trifluoromethanesulfonate boiling at about 89° to 91° C. at 740 mm. of Hg pressure, $n_D^{25}=1.3037$.

Analysis.—Calculated for $C_3H_2F_6O_3S$: 15.5% C; 49.1% F; saponification equivalent: 232. Found: 15.6% C; 49.4% F; saponification equivalent: 232.

This will be seen to agree with the physical constants reported for this material subsequent to my invention thereof by Burdon and McLoughlin, Tetrahedron, vol. 21, pages 1–4 (1965).

By a similar procedure employing 245 parts of trifluoromethanesulfonyl fluoride in 121 parts by volume of methylene chloride and adding 271 parts of 1,1-dihydroperfluorobutanol and 150 parts of triethylamine over about 1 hour followed by separation and work up as above, 1,1-dihydroperfluorobutyl trifluoromethanesulfonate is obtained as a clear colorless liquid boiling at 118° to 120° C. at 732 mm. of Hg pressure, $n_D^{25}=1.3020$.

Analysis.—Calculated for $C_5H_2F_{10}O_3S$: 18.2% C; 50.4% F. Found: 18.3% C; 50.5% F.

Other esters of the invention prepared by the above procedure include the following:

| Compound | Boiling point, ° C./mm. Hg press. | $n_D^{25}$ |
|---|---|---|
| $CF_3SO_2OCH_2CF_2CF_3$ | 102–5/740 | 1.3012 |
| $CF_3SO_2OCH_2(CF_2)_6CF_3$ | 74–5/5 | 1.3098 |
| $CF_3SO_2OCH_2CF_2CF_2H$ | 122–5/737 | 1.3203 |
| $CF_3SO_2OCH_2(CF_2)_4H$ | 69–72/21 | 1.3191 |
| $CF_3SO_2OCH_2(CF_2)_3H$ | 117–9/20 | 1.3200 |
| $CF_3SO_2OCH_2C_6F_{11}$ | 73–6/20 | 1.3253 |
| $(CF_3SO_2OCH_2CF_2)_2CF_2$ | 76–8/20 | 1.4252 |
| $CF_3SO_2OCH_2(CF_2)_2OCF_3$ | 120–3/740 | 1.3070 |

| | 65–6/22 | 1.3167 |

Example 2

The procedure of Example 1 is repeated, except that the sulfonyl fluoride is measured and added as a liquid without the necessity of condensation, using 13.5 parts of perfluoroethanesulfonyl fluoride in 30 parts by volume of methylene chloride at −80° and adding a mixture of 8 parts of 2,2,2-trifluoroethanol and triethylamine in 20 parts by volume of methylene chloride during about 10 minutes. The work-up and isolation procedure is as described in Example 1. 2,2,2-trifluoroethyl perfluoroethanesulfonate is obtained as a colorless liquid boiling at 105°–6° C. at 740 mm. of Hg pressure, $n_D^{25}=1.2038$.

Analysis.—Calculated for $C_4H_2F_8O_3S$: 17.0% C; 53.9% F. Found: 16.8% C; 54.6% F.

By a similar procedure 1,1-dihydroperfluorooctyl perfluorobutanesulfonate is obtained from the corresponding alcohol and sulfonyl fluoride.

Example 3

This example particularly illustrates the procedure employed for higher alcohols and sulfonyl fluorides.

To a mixture of 25.1 parts of perfluorooctanesulfonyl fluoride in 25 parts by volume of triethylamine in a suitable vessel protected from access of moisture are added 10 parts of 1,1-dihydroperfluorobutanol. The reaction mixture is stirred under reflux for four hours and poured into a mixture of about 25 parts of concentrated hydrochloric acid and 100 parts of ice. The product is extracted with diethylether and the ethereal solution is washed with water and dried. Evaporation of the ether provides crude 1,1-dihydroperfluorobutyl perfluorooctanesulfonate which is distilled. B.P. 225–7° at 740 mm. of Hg pressure. This ester solidifies slowly and is recrystallized from petroleum ether (B.P. 30° to 60° C.) and then melts at about 59° to 62° C.

*Analysis.*—Calculated for $C_{12}H_2F_{24}O_3S$: 21.1% C; 66.9% F. Found: 20.9% C; 66.3% F.

Example 4

This example particularly illustrates the preparation of an ester of the invention employing a 1,1-ω-trihydroperfluoroalkanol.

In a suitable vessel provided with mechanical agitation, thermometer, gas inlet and reflux condenser (cooled to about −75° C.) are placed 332 parts of 1,1,7-trihydroperfluoroheptanol, 120 parts of triethylamine and 500 parts by volume of methylene chloride. The mixture is maintained at about 10° to 20° and trifluoromethanesulfonyl fluoride is passed in rapidly over 1 hour until it no longer reacts as evidenced by persistent refluxing thereof when flow of acid fluoride is temporarily discontinued. No further reaction time is needed and the reaction mixture is worked up as in Example 1 above.

1,1,7-trihydroperfluoroheptyl trifluoromethanesulfonate is obtained as a mobile colorless liquid boiling at 75–8° C. at 9 mm. of Hg pressure, $n_D^{25}=1.3194$.

*Analysis.*—Calculated for $C_8H_3F_{15}O_3S$: 20.6% C; 61.5% F. Found: 20.4% C; 61.2% F.

By the same general procedure employing corresponding proportions of 1,1,11-trihydroperfluoroundecanol, 1, 1,11-trihydroperfluoroundecyl trifluoromethanesulfonate is obtained boiling at 125° to 130° at 10 mm. of Hg pressure. It solidifies and is recrystallized from petroleum ether and then melts at about 56° to 59° C.

The examples above describe methods generally adapted to preparing other esters of the invention employing perfluoroalkane sulfonyl fluorides and chlorides of 1 to 8 carbon atoms, perfluorocycloalkane sulfonyl fluorides and chlorides of 4 to 8 carbon atoms (available as described in U.S. Patent No. 2,732,398) and 2-hydroperfluoroalkane sulfonyl chlorides prepared from the acids or salts as described by Coffman and Raasch, supra. Thus, when the appropriate sulfonyl halides, preferably fluorides, are reacted with the carbinols indicated, the esters shown below are obtained.

| Carbinol | Product ester |
|---|---|
| $ClCF_2$—$CH_2OH$ | $ClCF_2$—$CH_2$—O—$O_2SCF_3$ |
| $Cl_2CF$—$CF_2$—$CH_2OH$ | $Cl_2CF$—$CF_2$—$CH_2$—O—$O_2SCF_3$ |
| $CC_5F_{11}$—$CFH$—$CF_2$—$CH_2OH$ | $C_5F_{11}$—$CFH$—$CF_2$—$CH_2$—O—$O_2SCF_3$ |
| $F_3CH_2OH$ | $CF_3CH_2$—O—$O_2SCF_2$—$CF_2H$ |

The following examples illustrate the use of esters of the invention in preparing 1,1-dihydropolyfluoroalkylated compounds.

Example 5

A suitable vessel equipped with mechanical agitator condenser, thermometer, addition tube and drying tube is charged with 3.0 parts (0.05 mole) ethylenediamine, 30 parts by volume of dry benzene and 33.2 parts of 1,1-dihydroperfluorobutyl trifluoromethanesulfonate. The mixture is brought to reflux and 10.1 parts (0.10 mole) of triethylamine are added gradually over 20 minutes. After refluxing for 1 hour further, the solution has become homogeneous and is then cooled, washed twice with water and the benzene phase is dried. Concentration and distillation of the residue provides N,N′-bis-1,1-dihydroperfluorobutyl-ethylenediamine boiling at 97° to 100° C. at 15 mm. of Hg pressure, $n_D^{25}=1.3282$.

*Analysis.*—Calculated for $C_{10}H_{10}F_{14}N_2$: 28.4% C; 62.8% F. Found: 28.1% C; 63.2% F.

The following tabulation (Table 1) shows shows other amines and their properties prepared by essentially the above procedure employing the reactants indicated:

TABLE I

| Compound | Amine | Ester | B.P./mm. | $n_D^{25}$ | M.P. |
|---|---|---|---|---|---|
| $CF_3CH_2N(Et)_2$ | $Et_2NH$ | $CF_3CH_2OSO_2CF_3$ | 89–91/740 | 1.3508 | |
| $[C_3F_7CH_2NH(CH_2)_3-]_2$ | $H_2N(CH_2)_6NH_2$ | $C_3F_7CH_2OSO_2CF_3$ | 70–72/20 | 1.3619 | |
| $H(CF_2)_6CH_2NHC_4H_9(n)$ | $C_4H_9NH_2$ | $H(CF_2)_6CH_2OSO_2CF_3$ | 85–93/8 | | |
| $C_7F_{15}CH_2N\diagup\diagdown NH$ | $HN\diagup\diagdown NH$ | $C_7F_{15}CH_2OSO_2CF_3$ | | | 72–74 |
| $H(CF_2)_6$—$CH_2$ <br> \| <br> N <br> \| <br> N <br> \| <br> $H(CF_2)_6$—$CH_2$ | $HN\diagup\diagdown NH$ | $H(CF_2)_6CH_2OSO_2CF_3$ | | | 60–62 |
| $H(CF_2)_6CH_2NHC_3H_7$ | $C_3H_7NH_2$ | $H(CF_2)_6CH_2OSO_2CF_3$ | 75–80/10 | 1.3378 | |
| $H(CF_2)_{10}CH_2N(C_4H_9)_2$ | $(n-C_4H_9)_2NH$ | $H(CF_2)_{10}CH_2OSO_2CF_3$ | 105–108/0.3 | 1.3533 | ~25 |
| $[H(CF_2)_8CH_2NHCH_2-]_2$ | $H_2NCH_2CH_2NH_2$ | $H(CF_2)_8CH_2OSO_2CF_3$ | | | 57–58 |
| $[H(CF_2)_6CH_2NH(CH_2)_3-]_2$ | $H_2N(CH_2)_6NH_2$ | $H(CF_2)_6CH_2OSO_2CF_3$ | 145–150/20 | 1.3579 | |

Example 6

A solution in 50 parts by volume of ethanol containing 8 parts of 1,1-dihydroperfluoroethyl trifluoromethanesulfonate, 7 parts of thiophenol and 2 parts of sodium hydroxide in 20 parts of water is refluxed for 1 hour, poured into water and the oily product extracted with ether. After washing and drying, ether is evaporated to give 1,1-dihydroperfluoroethylphenyl sulfide as a yellowish oil boiling at 83° to 84° at 15 mm. of Hg pressure, $n_D^{25}=1.4881$.

*Analysis.*—Calculated for $C_8H_7F_3S$: 50.0% C; 29.6% F. Found: 49.7% C; 29.5% F.

By a similar procedure 1,1-dihydroperfluoroethyl trifluoromethanesulfonate is reacted with phenol to give 2′,2′,2′-trifluoroanethole as a liquid with $n_D^{25}=1.4376$ and boiling at 55° to 58° C. at 10 mm. of Hg pressure.

By following essentially the above procedures 1,1-dihydroperfluoroalkyl ethers of the phenols are prepared using the reactants given in Table 2.

TABLE 2

| Ester | Phenol | Product |
|---|---|---|
| C₇F₁₅CH₂OSO₂CF₃ | HO–⟨C₆H₄⟩–CN | C₇F₁₅CH₂O–⟨C₆H₄⟩–CN |
| C₇F₁₅CH₂OSO₂CF₃ | ⟨C₆H₅⟩–O–⟨C₆H₄⟩–OH | C₇F₁₅CH₂O–⟨C₆H₄⟩–O–⟨C₆H₅⟩ |
| C₃F₇CH₂OSO₂CF₃ | naphthyl–OH | naphthyl–OCH₂C₃F₇ |
| H(CF₂)₈CH₂OSO₂CF₃ | NO₂–⟨C₆H₄⟩–OH | O₂N–⟨C₆H₄⟩–OCH₂(CF₂)₈H |
| H(CF₂)₂CH₂OSO₂CF₃ | HO–⟨C₆H₃(CH₃)₂⟩ (2,3-dimethylphenol) | CH₃–⟨C₆H₃(CH₃)⟩–OCH₂(CF₂)₂H |
| C₇F₁₅CH₂OSO₂CF₃ | HO–⟨C₆H₃(OH)⟩–C(=O)–⟨C₆H₅⟩ | ⟨C₆H₅⟩–C(=O)–⟨C₆H₃(OH)⟩–OCH₂C₇F₁₅ |
| C₇F₁₅CH₂OSO₂CF₃ | HO–⟨C₆H₄⟩–C(CH₃)₂–⟨C₆H₄⟩–OH | [C₇F₁₅CH₂O–⟨C₆H₄⟩–]₂C(CH₃)₂ |
| H(CF₂)₆CH₂OSO₂CF₃ | HO–⟨C₆H₄⟩–OCH₂C₆H₅ | H(CF₂)₆CH₂O–⟨C₆H₄⟩–OCH₂C₆H₅ |

Example 7

A solution of 3.3 parts of cyclohexanone piperidine-eneamine in 50 parts by volume of 1,2-dimethoxyethane is added to 4.68 parts of 1,1,7-trihydroperfluoroheptyl trifluoromethanesulfonate in a suitable vessel and the mixture is refluxed for 4 hours with agitation. To the cooled mixture are added 10 parts by volume of concentrated hydrochloric acid and the mixture is poured on ice and extracted with ether. The ethereal solution is washed with water, 10 percent aqueous sodium bicarbonate, dried and concentrated. Distillation of the residue yields 2-(1',1',7'-trihydroperfluoroheptyl)cyclohexanone boiling at 100° to 110° C. at 20 mm. of Hg pressure. It forms a 2,4-dinitrophenylhydrazone melting at 143° to 145° C.

Other eneamines as shown in Table 3 are employed in corresponding proportions with perfluoroalkanesulfonate esters to provide the indicated novel fluorinated carbonyl compounds.

TABLE 3

| Eneamine | Ester | Product |
|---|---|---|
| CH₃CH=CH–N(CH₃)₂ | CF₃CH₂OSO₂CF₃ | CF₃CH₂CHCHO |
| cyclopentene-morpholine | C₇F₁₅CH₂OSO₂CF₃ | 2-(CH₂C₇F₁₅)cyclopentanone |
| dihydronaphthalene-morpholine | H(CF₂)₂CH₂OSO₂CF₃ | β-tetralone-CH₂(CF₂)₂H |
| 5,5-dimethyl-3-(piperidino)cyclohex-2-enone | H(CF₂)₄CH₂OSO₂CF₃ | 2-CH₂(CF₂)₄H-5,5-dimethylcyclohexane-1,3-dione |
| cyclooctene-morpholine | CF₂ClCH₂OSO₂CF₃ | 2-(CH₂CF₂Cl)cyclooctanone |
| Camphor eneamine | C₃F₇CH₂OSO₂CF₃ | 3-(CH₂C₃F₇)camphor |

Example 8

Diethyl hydrogen phosphite (HOP(OC₂H₅)₂; 47 parts) in 200 parts by volume of tetrahydrofuran is reacted during about 1 hour with 7.5 parts of sodium metal. The solution is maintained at 25° and during 1 hour further 107 parts of 1,1-dihydroperfluorobutyl trifluoromethanesulfonate are added gradually: the solution is then refluxed for one hour. Reaction occurs by alkylation of the phosphorus atom. The reaction mixture is quenched in water and extracted with benzene. The extract is washed with water, dried, concentrated and the residue distilled. Diethyl 1,1-dihydroperfluorobutanephosphonate,

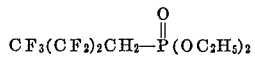

boils at about 72° to 72.5° C. at 2.5 mm. of Hg pressure, $n_D^{25}=1.3489$.

*Analysis.*—Calculated for $C_8H_{12}F_7O_3P$: 30.0% C; 3.7% H. Found: 29.7% C; 3.4% H.

By a similar procedure employing 1,1-dihydroperfluoroctyl trifluoromethanesulfonate, diethyl 1,1-dihydroperfluorooctanephosphonate is obtained as a liquid having $n_D^{25}=1.3486$ boiling at about 91° to 96° C. at 0.35 mm. of Hg pressure. Other sulfonate esters and phosphite esters react to produce esters of other fluorinated alkanephosphonates as indicated in Table 4.

TABLE 4

| Sulfonate ester | Phosphite ester | Product dialkyl fluorinated phosphonate |
|---|---|---|
| $C_7F_{15}CH_2OSO_2CF_3$ | $HOP(OC_4H_9)_2$ | $C_7F_{15}CH_2P(O)(OC_4H_9)_2$ |
| $C_7F_{15}CH_2OSO_2C_2F_5$ | $HOP(OC_6H_5)_2$ | $C_7F_{15}CH_2P(O)(OC_6H_5)_2$ |
| $H(CF_2)_{10}CH_2OSO_2CF_3$ | $HOP(OCH_3)_2$ | $H(CF_2)_{10}CH_2P(O)(OCH_3)_2$ |
| $CF_2(CF_2CH_2OSO_2CF_3)_2$ | $HOP(OC_2H_5)_2$ | $CF_2(CF_2CH_2P(O)O(C_2H_5)_2)_2$ |
| Cycl-$(C_5F_9O)$—$CH_2OSO_2CF_3$ | $HOP(OC_8H_{17})_2$ | Cycl-$(C_5F_9O)$—$CH_2P(O)(OC_8H_{17})_2$ |

The product dialkyl fluorinated phosphonates are readily hydrolyzed to the corresponding strong acids, converted to salts with, e.g. alkali metals, and to amides. They find utility as corrosion inhibitors, surfactants and as additives to oils.

The following examples further illustrate the use of esters of the invention particularly for the production of halides, tertiary amines and lower alkyl ethers. These examples further show the unexpected superiority of the esters of the invention with regard to reaction rates as compared to the known alkyl and aryl perfluoroalkanesulfonates.

Example 9

The rate of methanolysis of esters is determined by heating a dilute solution, e.g., a .0252 molar solution of 1,1 - dihydroperfluorethyl trifluoromethanesulfonate in methanol, to the desired temperature and titrating aliquots at intervals with standardized sodium hydroxide (to a bromthymol blue endpoint. From such data first order integrated rate constants are calculated.

Thus, the above solution is heated at 100.0° C. in a series of ampoules each containing about 6 ml. of the solution. At intervals an ampoule is removed and cooled and a 5.00 ml. aliquot is removed and tritrated with 0.0266 N sodium hydroxide. The titers at various times are:

| Time (hrs.:min.): | Titer (ml.) |
|---|---|
| 0 | 0.80 |
| 1:30 | 1.085 |
| 2:12 | 1.385 |
| 2:56 | 1.720 |
| 3:49 | 2.075 |
| 6:11 | 2.870 |
| 24[1] | 4.595 |

[1] After 24 hours at 120° C., theoretical titer is 4.72 ml.

The reaction constant is calculated to be $4.28\pm0.14\times10^{-5}$ reciprocal seconds. The half-life of the methanolysis at 100° C. is about 4.4 hours. Other esters of the invention show reaction constants of about the same order of magnitude, thus:

| Ester— | $K_1$ (reciprocal seconds) |
|---|---|
| $CF_3SO_2OCH_2CF_2CF_3$ | $1.01\pm0.01\times10^{-5}$ |
| $CF_3SO_2OCH_2CF_2CF_2CF_3$ | $0.631\pm0.006\times10^{-5}$ |
| $CF_3SO_2OCH_2CF_2CF_2H$ | $6.46\pm0.04\times10^{-5}$ |
| $CF_3CF_2SO_2OCH_2CF_3$ | $6.76\pm0.1\times10^{-5}$ |

By contrast to the above, alkyl esters, e.g., methyl trifluoromethanesulfonate, are very readily alcoholized the reaction in a comparable experiment being substantially complete in about 8 minutes at room temperature. On the other hand aryl esters, such as phenyl or p-nitrophenyl trifluoromethanesulfonate or anisyl perfluorooctanesulfonate show no appreciable alcoholysis in 24 hours at 96 C. under comparable conditions.

Example 10

A suitable vessel fitted for stirring and reflux is charged with 46.6 parts (0.20 mole) of 1,1-dihydroperfluoroethyl trifluoromethanesulfonate and 32.2 parts (0.44 mole) of diethylamine in 100 parts by volume of benzene. After stirring and refluxing for 1 hour a brownish oil separates which solidifies on cooling at 0° C. It is collected and washed with cold benzene. It is diethylammonium trifluoromethanesulfonate.

The benzene solution and wash are combined and extracted with 100 parts by volume of 10 percent aqueous hydrochloric acid. The acid extract is washed with ether and neutralized with sodium hydroxide. The oily product is extracted in ether and these extracts are dried over magnesium sulfate, concentrated carefully and distilled through a column. 1,1-dihydroperfluoroethyldiethylamine is obtained in 84 percent yield as a liquid boiling at 89° to 91° C. at 740 mm. of Hg pressure. $n_D^{25}=1.3508$. The hydrochloride, M.P. 164–5° C., is analyzed.

*Analysis.*—Calculated for $C_6H_{13}NF_3Cl$: 37.6% C; 29.7% F. Found: 37.6% C; 29.8% F.

It will be noted that Brown and Tiers, Journal of Organic Chemistry, vol. 22, page 454 (1957), obtained a much lower yield in the alkylation of piperidine (a much stronger base) using the tosylate of 1,1-dihydroperfluorobutanol and considerably more vogorous conditions, e.g., 175° C. for 20 hours in a sealed tube.

Example 11

The perfluoroalkane sulfonate esters of the invention are very useful for the production of the 1-halides of the polyfluorinated alcohols. The reaction proceeds much more readily than is the case when tosylates are used as described by Tiers, Brown and Reid, Journal of the American Chemical Society, vol. 75, pages 5978–9 (1953). The procedures described here are exemplary of procedures employing other alkali metal halides as well as other sulfonate esters of the invention.

A suitable vessel fitted with thermometer, distillation head and mechanical agitation is charged with 30 parts (0.2 mole) of sodium iodide and 100 parts by volume of anhydrous acetone. Solution occurs exothermically (to 35°) and 23.2 parts (0.1 mole) of 1,1-dihydroperfluoroethyl trifluoromethanesulfonate is then added. The temperature rises further to 50° in 5 minutes and falls to 40° over 1.5 hours. The reaction mixture is poured onto ice and the denser organic phase separated, washed with a small amount of aqueous sodium thiosulphate to remove an iodine color, dried and distilled. 1,1-dihydroperfluoroethyl iodide boils at 60–61° at atmospheric pressure.

In experiments to determine the rate of reaction of 1,1-dihydroperfluoroethyl trifluoromethanesulfonate with iodide ion in acetone at 25° C. it is found that the second order rate constant is about $.0149\pm.003$ liter per mole-second. The rate constant for the reaction of 1,1-dihydroperfluoroethyl bromide with iodine ion is extrapolable to comparable conditions from the results of McBee and coworkers, Journal of the American Chemical Society, vol. 84, page 3157 (1962), and is found to be slower by about five orders of magnitude, i.e., 100,000 times.

Example 12

The reactivity of the perfluoroalkane sulfonate esters of the invention is illustrated by the fact that they readily yield the p-toluenesulfonate and other substituted and unsubstituted arenesulfonate esters by reaction with alkali metal salts of the latter. Thus, 2.0 parts of lithium p-toluenesulfonate and 2.0 parts of the 1,1-dihydroperfluorobutyl trifluoromethanesulfonate of Example 1 are dissolved in 8 parts by volume of dimethylformamide and the solution is heated to 120° C. A vigorous reaction occurs and the reaction mixture is refluxed for a further 0.5 hour, cooled and poured into cold water. The aqueous suspension is extracted with ether, and the organic phase is washed with salt solution, dried over anhydrous magnesium sulfate and concentrated. The residual oil is distilled at 65° to 75° at 1 mm. of Hg pressure to give 1,1-dihydroperfluorobutyl p-toluenesulfonate which eventually solidifies and then melts at 28° to 89° C. and is identical to an authentic sample.

Esters of other fluorinated carbinols with arene-sulfonic acids are prepared by the same procedure employing alkali metal salts of the desired substituted or unsubstituted arene-sulfonic acid in the above procedure. This provides a convenient expedient for the modification of dyestuffs containing sulfonic acid groups to introduce at least slight fluorocarbon solubility.

Example 13

This example further illustrates the utility of the invention in reactions with anionic nucleophiles. A mixture of 25 parts of 1,1-dihydroperfluorooctyl trifluoromethanesulfonate of Example 1 and 10 parts of potassium thiocyanate in 80 parts by volume of isopropanol is refluxed for 4 hours. After cooling, the solution and precipitate are poured into an excess of water and the organic precipitate is collected and dried under reduced pressure at 50° C. Recrystallization from a mixture of ether and petroleum ether gives 1,1-dihydroperfluorooctyl thiocyanate melting at about 63° to 66° C.

Calculated for $C_9H_2F_{15}NS$: 24.5% C; 64.6% F. Found: 24.4% C; 64.6% F.

This novel fluorinated thiocyanate is representative of the series of compounds obtained when other of the above described perfluoroalkanesulfonate esters of the formula $(R_fSO_2OCH_2)_2Q$ are used in the above procedure. These thiocyanates are useful intermediates for conversion to 1,1-dihydroperfluoroalkyl sulfur compounds.

Example 14

This example illustrates the preparation of dihydroperfluoroalkyl hydrazines. A mixture of 26.6 parts of 1,1-dihydroperfluorooctyl trifluoromethanesulfonate from Example 1, 5 parts of 95 percent hydrazine and 75 parts by volume of isopropanol is refluxed with stirring for 3 hours and the reaction mixture poured into water. The solution is extracted with ether. The ethereal extract is washed with saline solution and dried. Saturation of the ethereal solution with anhydrous hydrogen chloride precipitates 1,1-dihydroperfluorooctyl hydrazine hydrochloride melting at about 231° to 233° C. The free base, 1,1-dihydroperfluorooctyl hydrazine is liberated by 10 percent aqueous sodium hydroxide as an oil which is distilled at 73°–75° C. at 5 mm. Hg pressure.

Calculated for $C_8F_{15}H_5N_2$: 23.3% C; 69.0% F. Found: 23.2% C; 68.1% F.

When the above procedure is repeated employing other highly fluorinated perfluoroalkane sulfonates, other hydrazines of the series $Q(CH_2NHNH_2)_m$ are obtained. Substituted hydrazines such as phenylhydrazine and the like are also suitable in the above procedure giving hydrazines of the series $Q(CH_2NHNHR)_m$ wherein R is unsubstituted or substituted alkyl, aryl, aralkyl and the like.

| Sulfonate ester | Product hydrazine |
| --- | --- |
| $C_7F_{15}CH_2OSO_2CF_3$ | $C_7F_{15}CH_2NH-N(CH_3)_2$ |
| $C_3F_7CH_2OSO_2CF_3$ | $C_3F_7CH_2-NH-N\!\!\begin{array}{c}\diagup CH_2-CH_2 \diagdown \\ \diagdown CH_2-CH_2 \diagup\end{array}\!\!N-NH-CH_2-C_3F_7$ |
| $C_3F_7CH_2OSO_2C_2F_5$ | $C_3F_7CH_2-NH-NH-C_6H_5$ |
| $C_7F_{15}CH_2OSO_2CF_3$ | $C_7F_{15}CH_2-NH-N\!\!\begin{array}{c}\diagup CH_2-CH_2 \diagdown \\ \diagdown CH_2-CH_2 \diagup\end{array}\!\!CH_2$ |
| $C_3F_7CH_2OSO_2CF_3$ | $C_3F_7CH_2-NH-NH-CH_2C_3F_7$ |
| $(CF_2)_3(CH_2OSO_2CF_3)_2$ | $(CF_2)_3(CH_2NHNHC_6H_5)_2$ |
| $Cycl\text{-}(C_5F_9O)-CH_2OSO_2CF_3$ | $Cycl\text{-}(C_5F_9O)-CH_2-N(CH_3)-N(CH_3)_2$ |

These hydrazines are useful chemical intermediates.

What is claimed is:

1. A sulfonate ester of the formula:

$$(R_fSO_2OCH_2)_mQ$$

wherein $R_f$ is a hyperfluorinated alkyl group of 1 to 8 carbon atoms, Q is a highly fluorinated alkyl group of valence $m$ comprising at least about 40 percent by weight of fluorine selected from the group consisting of:
   (a) perfluoroalkyl of 1 to 17 carbon atoms,
   (b) perfluorocycloalkyl of 4 to 11 carbon atoms,
   (c) omega-hydroperfluoroalkyl of an even number of carbon atoms from 2 to 18,
   (d) 2-hydroperfluoroalkyl of 3 to 11 carbon atoms,
   (e) chloro-difluoromethyl,
   (f) 3-oxa-perfluoroalkyl of 3 to 6 carbon atoms and 1 oxygen atom, and $m$ is an integer from 1 to 2.

2. Perfluoroalkanesulfonate ester of 1,1 - dihydroperfluoroalkanol of the formula:

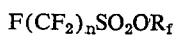
$$F(CF_2)_nSO_2OR_f$$

wherein $R_f$ is 1,1dihydroperfluoroalkyl of 2 to 18 carbon atoms and $n$ is an integer from 1 to 8.

3. Perfluoroalkanesulfonate ester of 1,1-ω-trihydroperfluoroalkanol of the formula:

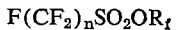
$$F(CF_2)_nSO_2OR_f$$

wherein $R_f$ is 1,1-ω-trihydroperfluoroalkyl of an even number of carbon atoms from 2 to 18 and $n$ is an integer from 1 to 8.

References Cited
UNITED STATES PATENTS

| | | | |
|---|---|---|---|
| 3,346,612 | 10/1967 | Hansen | 260—456 |
| 2,732,398 | 1/1956 | Brice et al. | 260—456 X |

CHARLES B. PARKER, *Primary Examiner.*

L. C. MARUZO, *Assistant Examiner.*

U.S. Cl. X.R.

260—239, 247, 250, 268, 290, 293, 309, 326.8, 332.5, 333, 345.1, 345.9, 347.2, 454, 455, 465, 483, 485, 502.4, 551, 552, 563, 566, 570.5, 576, 577, 583, 586, 587, 590, 591, 593, 601, 607, 609, 611, 612, 613, 614, 648, 653, 955, 969; 252—49.8, 352, 389

UNITED STATES PATENT OFFICE
CERTIFICATE OF CORRECTION

Patent No. 3,419,595                                                   December 31, 1968

Robert L. Hansen

It is certified that error appears in the above identified patent and that said Letters Patent are hereby corrected as shown below:

Column 4, line 60, "1.2038" should read -- 1.3028 --. Column 6, line 4, "$CC_5F_{11}$" should read -- $C_5F_{11}$ --; line 5, "$F_3CH_2OH$" should read -- $CF_3CH_2OH$ --. Column 11, line 59, "89°" should read -- 29° --. Column 12, line 75, "1 oxygen atom, and m is an integer from 1 to 2." should read -- 1 oxygen atom, (g) perfluoroalkylene of 1 to 10 carbon atoms, and m is an integer from 1 to 2. --.

Signed and sealed this 17th day of March 1970.

(SEAL)
Attest:

Edward M. Fletcher, Jr.                                     WILLIAM E. SCHUYLER, JR.
Attesting Officer                                                     Commissioner of Patents